United States Patent
Caron et al.

(10) Patent No.: US 6,449,659 B1
(45) Date of Patent: Sep. 10, 2002

(54) SYSTEM FOR INSTANCE CUSTOMIZATION WITH APPLICATION INDEPENDENT PROGRAMMING OF CONTROLS

(75) Inventors: Ilan Caron, Seattle; Alan W. Carter, Bellevue; Satish Kumar Chittamuru, Issaquah; Rajiv Kumar, Redmond; Mei-Chin Tsai, Bellevue; Scott Michael Wiltamuth, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/892,684

(22) Filed: Jul. 14, 1997

(51) Int. Cl.⁷ .................................................. G06F 9/44
(52) U.S. Cl. ...................................... 709/315; 709/328
(58) Field of Search ................................. 707/300, 307; 709/315, 328; 717/1, 100, 101; 345/765, 762

(56) References Cited

U.S. PATENT DOCUMENTS

| | | |
|---|---|---|
| 4,775,950 A | 10/1988 | Terada et al. |
| 4,860,291 A | 8/1989 | Damm et al. |
| 5,051,938 A | 9/1991 | Hyduke |
| 5,126,966 A | 6/1992 | Hafeman et al. |
| 5,278,769 A | 1/1994 | Bair et al. |
| 5,373,514 A | 12/1994 | Ma |
| 5,421,012 A | 5/1995 | Khoyi et al. |
| 5,423,023 A | 6/1995 | Batch et al. |
| 5,426,770 A | 6/1995 | Nuiber |
| 5,446,742 A | 8/1995 | Vahabi et al. |
| 5,542,039 A | 7/1996 | Brinson et al. |
| 5,544,285 A | 8/1996 | Glaser et al. |
| 5,560,005 A | 9/1996 | Hoover et al. |
| 5,574,893 A | 11/1996 | Southgate |
| 5,600,778 A | 2/1997 | Swanson et al. |
| 5,602,997 A | 2/1997 | Carpenter et al. |
| 5,630,125 A | 5/1997 | Zellweger |
| 5,649,192 A | 7/1997 | Stucky |
| 5,659,740 A | 8/1997 | Ezaki et al. |
| 5,680,524 A | 10/1997 | Maples et al. |
| 5,680,559 A * | 10/1997 | Chew et al. ................. 345/335 |
| 5,689,662 A | 11/1997 | Nakajima et al. |

(List continued on next page.)

OTHER PUBLICATIONS

Notkin et al, "Interconnecting Heterogeneous Computer System", *Communications of ACM*, vol. 31, No. 3, Mar. 1988.

Pratt, Terrence W., "Using GODIVA for Data Flow Analysis", ACM, 1998.

Penedo, "Acquiring Experience with Executable Process Models", IEEE, Feb. 1990.

Von Hoff, Arthur, "Java and Internet Programming", *Dr. Dobb's Journal of Software Tools*, vol. 20, No. 8, Aug. 1995.

*Primary Examiner*—St. John Courtenay, III
*Assistant Examiner*—Sue Lao
(74) *Attorney, Agent, or Firm*—Leydig, Voit & Mayer, Ltd.

(57) ABSTRACT

The system for instance customization with application independent programming of controls functions to place code behind documents in a multi-program environment in a manner that eliminates the object instance management problems of existing systems. The system consists of the process whereby the behavior of an object is changed by the user without changing its identity. In particular, the system for instance customization with application independent programming of controls combines a customizable object and a language engine object to form the customized instance of the object. Instance customization is enabled by the customized object aggregating the user defined customizations into a standard object that is supplied by Visual Basic. The Visual Basic object is given a pointer to the standard part of the document object which implements the base functionality of the document.

30 Claims, 8 Drawing Sheets

U.S. PATENT DOCUMENTS

| | | | |
|---|---|---|---|
| 5,710,925 A | * 1/1998 | Leach et al. | 709/303 |
| 5,736,983 A | 4/1998 | Nakajima et al. | |
| 5,748,907 A | 5/1998 | Crane | |
| 5,752,018 A | 5/1998 | Sheffield | |
| 5,754,858 A | * 5/1998 | Broman et al. | 395/701 |
| 5,778,378 A | * 7/1998 | Rubin | 707/103 |
| 5,815,415 A | 9/1998 | Bentley et al. | |
| 5,815,712 A | 9/1998 | Bristor et al. | |
| 5,819,283 A | 10/1998 | Turkowski | |
| 5,852,441 A | 12/1998 | Nakajima | |
| 5,873,069 A | 2/1999 | Reuhl et al. | |
| 5,884,097 A | 3/1999 | Li et al. | |
| 5,903,905 A | * 5/1999 | Andesen et al. | 707/526 |
| 5,905,987 A | 5/1999 | Shutt | |
| 5,914,720 A | 6/1999 | Maples et al. | |
| 5,915,252 A | 6/1999 | Misheski | |
| 5,915,253 A | 6/1999 | Christiansen | |
| 5,936,860 A | 8/1999 | Arnold et al. | |
| 5,937,189 A | 8/1999 | Branson | |
| 5,970,498 A | 10/1999 | Duffield | |

* cited by examiner

SYSTEM FOR INSTANCE CUSTOMIZATION WITH APPLICATION INDEPENDENT PROGRAMMING OF CONTROLS

CROSS-REFERENCE TO RELATED APPLICATIONS

This application is related to U.S. patent 6,108,661, "System for Instance Customization," issued on Aug. 22, 2000, and to U.S. patent application 08/890,684, "System for Application Independent Programming of Controls," filed on Jul. 14, 1997.

FIELD OF THE INVENTION

This invention relates to processors that have a plurality of application programs installed thereon, each of which has its own internally defined set of objects. The system for instance customization with application independent programming of controls functions to provide the capability for a user to change an object's behavior within a customized instance of a document in an application program without changing the object's identity and without impacting other users who have their own instances of the object, while also providing both a consistent programming model and functionality for these objects.

PROBLEM

It is a problem in application programs to manage customized instances of objects and to provide a consistent programming model and functionality for the controls that are defined by a variety of application program and component vendors, as well as by individual users. This problem is especially relevant in an office suite type of environment on a personal computer, where each application program in the office suite can embed objects into an extended object, which is implemented in the application program, to modify the properties, methods and events of the embedded objects. This creation of customized objects by embedding objects in the application program causes difficulty in maintaining consistency of reference when multiple users concurrently access the object and make changes to the object. This is especially problematic when the reference to the object spans multiple application programs.

As an illustration, the Microsoft Office suite of application programs comprises a Visual Basic for Applications (also termed Visual Basic) layer on which is overlaid a plurality of application programs, including: PowerPoint, Word, and Excel. Early versions of Visual Basic put code behind objects, such as forms, using a class customization model, in which the identity of the object changes during the transition from design-time to run-time. This model works for Visual Basic but does not work for the Microsoft Office environment of application programs. If Microsoft Office were to use a class customization model, then the Object Linking and Embedding (OLE) object identity of an Excel spreadsheet, Word document, etc. would change when major changes were made to the code behind the spreadsheet or document. The problem with this is that any clients who were holding onto an instance pointer of the spreadsheet or document would end up with an invalid pointer, since the underlying object that was pointed to no longer exists. A user would then have to take whatever action is necessary in order to refresh the instance pointer in every instance it is used in each application program to now point to the new instantiation of the object. Thus, an apparently benign action, such as adding a table to a Word document, can cause the interface of the Word document to change, since a property may be added to the Word document for accessing the table.

The above-noted problem is further compounded by the problem of providing a consistent programming model and functionality for the controls that that are defined by a variety of application program and component vendors, as well as individual users. This is because the application programs that are installed on a processor each have their own way of extending controls and these extensions are typically inconsistent in their implementation across the plurality of application programs. The existence of a common programming tool in an office suite environment raises users' expectations for a common programming model for using controls. Without specific support in the programming tool, it is extremely difficult to attain such a common programming model. Each application program in the office suite would need to provide its own implementation of the controls by embedding the controls, which are provided by the underlying common programming tool, into an extended control, which is implemented in the application program, to modify the properties, methods and events of the embedded controls. Duplicating this work in all applications would result in inconsistent interfaces and operation of controls as well as increased cost of implementation due to the replication of the control programmability function across the various application programs.

SOLUTION

The present system for instance customization with application independent programming of controls functions to place code behind documents in a multi-program environment in a manner that eliminates the object instance management problems of existing systems. The instance customization portion of the present system consists of the process whereby the behavior of an object is changed by the user without changing its identity. This is accomplished by combining a customizable object and a language engine object to form the customized instance of the object. The instance customization portion of this system is enabled by the customized object aggregating the user defined customizations into a standard object that is supplied by Visual Basic. The Visual Basic object is given a pointer to the standard part of the document object which implements the base functionality of the document.

As an example, some users of Microsoft Office application programs implement customized objects by using the Visual Basic layer directly, while many users use Visual Basic indirectly through the wizards or tools that are provided in the application programs. An instance-based programming model of objects is therefore easier for these users to understand since this is the paradigm implemented in the indirect case. For example, a user places a control on a document and writes event handling code for it. The programming model that the user sees is like Visual Basic, in that the control is accessible as a property on the control container. The system for instance customization with application independent programming of controls enables clients to hold a pointer to the document object and the user programmed control, without it becoming invalidated. Another example is where an Excel workbook is embedded in a Visio drawing. A user places a button on the document and writes event handling code for the button. Instance customization is required for this scenario because the embedding protocol assumes that the identity of an embedding is constant. This protocol and others that make similar assumptions cannot be changed because they are an integral part of the application programs. All containers of the object would therefore have to use the new protocol. In addition, all containees of the object, such as controls, would have to use the new protocol since it is possible for a containee to obtain a pointer to its container. The only possible way out of this would be to say that the object being customized by the user has a different identity from the embedded object. In other words, there are two parallel worlds—one for internal consumption and one for external consumption, which is an unacceptable limitation.

The present system for instance customization with application independent programming of controls also functions to provide a common programming model for a set of controls used in a plurality of application programs, such as those typically included in an office suite, installed on a processor, while also enabling customization of these controls for each application program. This is accomplished by producing an interface in an underlying common programming tool which enables a host application program to augment the properties, methods and events provided by the underlying controls by adding "extender" properties, methods and in a consistent manner. The user can thus use a control in a variety of application programs, and have both a consistent experience as well as a customized experience—"consistent" in the sense that the functionality that is unique to the control is the same from application to application, and "customized" in the sense that behavior that is unique to the control container is different from application program to application program. All of this is accomplished without having to replicate the underlying control programmability function on which the customization is based. The host application developer creates an extender file to add and/or modify the standard properties, methods and events of a control. The resulting extender file is later used to produce an extended control for use in this application program. The system for instance customization with application independent programming of controls merges, at run time, the standard control and the extender file to create the customized control. This enables application programs to create and use customized controls without having to replicate existing control programmability functions and also enables consistency of control implementation.

The customization of the control is created when the user takes actions that make it clear that they would like to use a specific control in a specific application program. This application program calls the controls interface of the Visual Basic layer which produces a type library entry to describe the properties, methods and events of the extended control that the user has created. This application program also maintains a type description extender library wherein an extender is an object which implements the extender properties and methods supplied by the application program. These properties and methods are typically specific to the application program. In the use of visual controls, for example, it is common for different application programs to present different mechanisms for positioning the visual controls. In a word processor, for instance, it might be useful to position controls relative to text characters. In a spreadsheet, it might be useful to position controls relative to cells in the spreadsheet. In other application programs it may be most appropriate to position controls using a two-dimensional coordinate system. Each application program may use the extender mechanism to provide its own, application program specific, properties and methods. In the case of control positioning in a two-dimensional coordinate system, this could mean providing Top and Left properties, for example. A pointer to the extender entry is returned from the application program to the Visual Basic controls interface as an output parameter to link the standard control in the Visual Basic layer and its customization definition as maintained in the application program. At run time, the system for instance customization with application independent programming of controls operates on the type definitions of extenders maintained in the application program's standard library to implement the set of customized controls.

DETAILED DESCRIPTION

Figure 1:
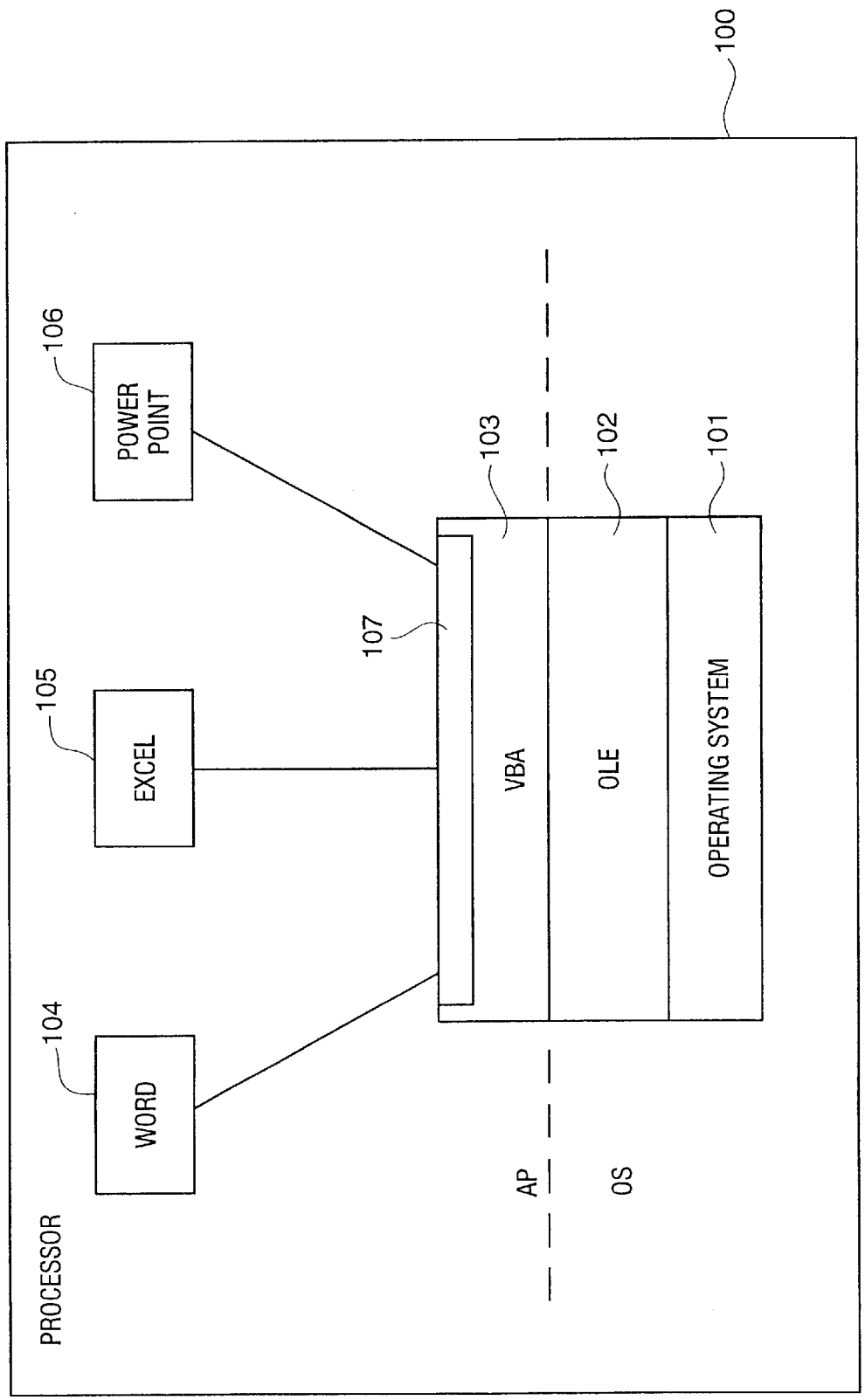
FIG. 1 illustrates in block diagram form the program hierarchy installed in a typical processor.

The present system for instance customization with application independent programming of controls functions to place code behind documents in a manner that eliminates the instance management problems of existing systems. The system for instance customization with application independent programming of controls consists of the process whereby the behavior of an object is changed by the user without changing its identity. In particular, the system for instance customization with application independent programming of controls combines a customizable object and a language engine object to form the customized instance of the object. Instance customization is enabled by the customized object aggregating the user defined customizations into a standard object that is supplied by Visual Basic. The Visual Basic object is given a pointer to the standard part of the document object which implements the base functionality of the document. In addition, the system provides a common programming model for the controls that are used in the plurality of application programs. This is accomplished by producing an interface in the Visual Basic layer underlying the application programs which enables a selected application program to augment the properties, methods and events provided by the underlying controls by adding "extender" properties, methods and events in a consistent manner. The user can thus use a control in a variety of application programs and have both a consistent experience as well as a customized experience "consistent" in the sense that the functionality that is unique to the control is the same from application program to application program, and "customized" in the sense that behavior is unique to the control container is different from application program to application program. All of this is accomplished without having to replicate the underlying control programmability function on which the customization is based.

Definitions

The following list of definitions provides a baseline characterization of a number of the descriptive terms used herein:

1. Type information includes a description of everything a client needs to know to use the services that are provided by an object. In addition, for each interface that an object supports, the object's type information includes a list of the methods and properties associated with the interface, along with a description of the parameters for those methods. A type library therefore comprises a collection of type information which represents a set of standardized descriptions of object interfaces.

2. Embedding is the function whereby information, such as a chart or an equation or spreadsheet data, is inserted in a document active in another application program, such as a Word document. Once embedded, the information, termed an object, becomes part of the Word document. When a user selects an embedded Word object, the CPU opens the application program in which the object was created and the object is displayed and ready for editing.

3. Container—When information from two separate pieces of software are combined in a compound document, one piece of software acts as the container and the other acts as the server. OLE allows a server to either embed its data in the container or link its data to the container. Embedding means that the server's data is stored in the same file as the container's data. With linking, the server's data remains in its own file and only a reference to that data is stored in the container's file.

4. Containment/Aggregation—Containment comprises enclosing an object within another so that the inner object is used by the outer object exactly as any other client would use the inner object. Aggregation simply exposes a number of the inner objects' interfaces without requiring any intervening interfaces. For example, a control does not maintain properties and support methods that are relevant only to the container. For the container to package its own custom properties and methods in a control, so these properties and methods appear to be native to the control itself, an extended control must be created. The extended control is a partial control that wraps around another control through containment and aggregation to supply the extended functionality that the control itself knows nothing about. Thus, the container provides its own extended control implementation that overrides specific interfaces on the control through containment and exposes the remaining interfaces through aggregation.

5. Control—A control is a user interface that transforms an external event, such as a mouse click, keystroke, telephone call, and the like, into a meaningful programmatic event. At the occurrence of a programmatic event, an event handler in a control container executes code, a command, or activates some element associated with the CPU. A control can also have no events and function to expose properties and methods. Thus, a control is a collection of functionality and content that is self-contained in that the control is independent of the application program in which it resides.

6. Event—An event is a mechanism that is used to extend and modify a control's behavior. An event is a stimulus which triggers the execution of event specific code and/or a mechanism through which the control notifies the container of events that occur within the control.

Software Architecture

FIG. 1 illustrates a typical software architecture 100 for a standard computer system, such as a personal computer, which architecture 100 includes the system for application independent programming of controls 107 of the present invention. As an illustration, the Microsoft Office suite comprises a Visual Basic layer 103 on which is overlaid a plurality of application programs, including: PowerPoint 106, Word 104, and Excel 105. The dotted line drawn horizontally across the middle of FIG. 1 illustrates the conceptual distinction between what is traditionally termed the operating system (OS) and what is traditionally termed the application program (AP) environment. The system for instance customization with application independent programming of controls 107 is part of the Visual Basic layer 103. The Visual Basic layer 103 interconnects with an Object Linking and Embedding (OLE) layer 102 which is interposed between the Visual Basic layer 103 and the host operating system 101.

The application programs 104–106 use system for instance customization with application independent programming of controls 107 to offer a controls interface which enables each of the application programs 104–106 to provide a common programming model for controls which are maintained in the Visual Basic layer 103. Each user of the application programs 104–106 can access the common set of controls and thence customize a control for use in a selected one of the application programs. The customization of the control is implemented when the user designs a control in the selected application program and the application program calls the controls interface (system for instance customization with application independent programming of controls 107) of the Visual Basic layer 103 which produces a type library entry to describe the properties, methods and events of the extended control that the user has created. The application program maintains a type description extender library, wherein an extender is an object which implements the extender properties and methods supplied by the application program, such as Top, Left, height and the like. A pointer to the extender entry is returned from the application program to the system for instance customization with application independent programming of controls 107 as an output parameter to link the standard control in Visual Basic 103 and its customization definition as maintained in the application program. The type definitions of extenders are part of the application program's standard library.

Object Programmability in Existing Application Programs

For objects in application programs to be programmable, they must be capable of being driven not only by the users, but also by other application programs. Since various application programs use different languages for implementation, there must be a standard manner in which the programs can interact. This interaction is enabled by the COM objects used by application programs. Application programs allow access to their services through the interfaces exposed by their COM objects. Any piece of software that can invoke a method exposed by a COM object can use the services of the embedded application program. However, the COM interface is typically implemented using a vtable which is a table of pointers to functions. To access an underlying service, the invoking application must traverse the table of pointers to locate the desired pointer, then pass the necessary parameters across this interface in the proper format. To overcome this inherent complexity, the IDispatch interface is used to expose an application program's internal functions to other software. IDispatch is a standard COM interface, but includes a function termed "Invoke" that can be used to invoke other functions. Thus, the developer in implementing IDispatch, specifies what methods are available to be invoked by defining a dispatch interface, termed "dispinterface" which provides a simple identifier listing of methods. The selected method is called by simply passing the method identification in the dispinterface.

Every interface in an object inherits from IUnknown, and therefore the first three pointers in an interface point to IUnknown's three methods: QueryInterface, AddRef, Release. When a client invokes a method in an interface, the structure of pointers in the interface is traversed until the correct pointer is located. The pointer to the vtable leads to the pointer for the desired method, which in turn leads to the code that provides the desired service. The Queryinterface method of IUnknown enables the user to request identification data from the process itself to locate the proper interface. The object then returns the proper pointer to the desired interface. When a user desires to change features defined in an object, the existing interfaces can not be changed and a new interface must be added to address the newly added functionality. A running object remains in existence until it is no longer needed. To avoid the problem of an object being closed while some application is still referencing the object, the object implements reference counting. Whenever the object passes out a pointer to one of its interfaces in response to a call to the AddRef method of the IUnknown interface, it adds a count of 1 to the reference count. When the access is completed, the client must call the Release method of the IUnknown interface to thereby reduce the reference count and ensure that the object is maintained for only the presently active clients. Once the reference count reaches 0, the object can be closed/destroyed, since there are presently no clients being served.

To interact with a client, an object must support at least one outgoing interface. In the instance of this interface, the object acts as a client. To qualify as a connectable object, the object must support an interface termed "IConnectionPointContainer". This interface identifies to the clients which outgoing interfaces are supported by the object. Each of these outgoing interfaces is represented by a separate connection point object within the IConnectionPointContainer interface. The client's implementation of the interface that connects to a desired one of the connection point objects is termed a sink.

Instance Customization Architecture

Given this environment, the system for instance customization with application independent programming of controls functions to put code behind application program documents to enable users to customize instances of objects that appear in an application program. Instance customization is enabled by the customized object aggregating the code provided by a user in a customizable object that is supplied by the Visual Basic layer 103. The Visual Basic object is given a pointer as part of the definition of the customized document object and comprises the element which implements the "base" functionality of the document object. Instance customization therefore seeks to combine a customizable object (termed "Extensible Object" herein) and a language engine object to form the customized instance.

Figure 2:
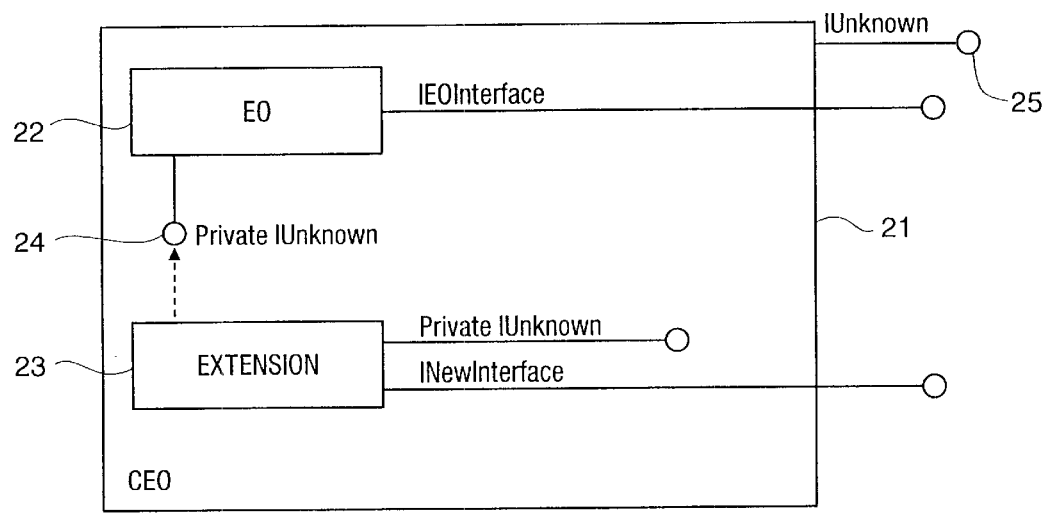
FIG. 2 illustrates the interrelation of the various elements contained within an extended object in the present system for instance customization with application independent programming of controls.

This customization is accomplished by the elements shown in FIG. 2, wherein an Extensible Object (EO) 22 is an object provided by the Visual Basic layer 103 that can be extended by an Extension 23. The Extension 23 may add behavior to the Extensible Object 22 by handling its events, by adding new interfaces, or by adding new members and events. The user can therefore change an Extensible Object's behavior or even create a new type of object that is based upon the original Extensible Object, using this paradigm. The Controlling Extensible Object (CEO) 21 becomes the controlling unknown, wherein the Controlling Extensible Object 21 is the IUnknown implementation of the object that controls the QueryInterface behavior, that is, it controls what interfaces are exposed by the object for the Extensible Object 22 that is customized.

FIG. 2 illustrates how the Controlling Extensible Object 21, Extensible Object 22, and Extension 23 relate to one another. The Extensible Object 22 and the Extension 23 are aggregated into the Controlling Extensible Object 21. The Extension 23 holds a Private IUnknown pointer 24 to the Extensible Object 22. A requirement for a ControllingExtensible Object 21 is that it implement the interface IUnknown 25 as an external interface so that it can be directly accessed. The Controlling Extensible Object 21 implements the controlling unknown. As such, the Controlling Extensible Object 21 is responsible for dynamically exposing interfaces that are added to the Extensible Object 22 by the Extension 23. The Controlling Extensible Object 21 may do this by forwarding the Query Interface request to the Extension 23 when an unrecognized interface is requested. The Controlling Extensible Object 21 must also expose several interfaces defined on the Extension 23 by delegating Query Interface requests for these interfaces to the Extension 23. These interfaces are:

IDispatch.

IConnectionPointContainer.

the default interface for the object.

The following table lists these interfaces and the corresponding functions or behaviors that are implemented by access to these interfaces:

| Behavior | Which Extensible Objects support their behavior | Related Interfaces |
| --- | --- | --- |
| Implement Private Unknown | All | IUnknown |
| Expose properties and methods | Extensible Objects that have properties and methods | IDispatch |
| Expose events | Extensible Objects that have events | ICPContainer IConnectionPoint |

Implement Private Unknown

Figure 3:
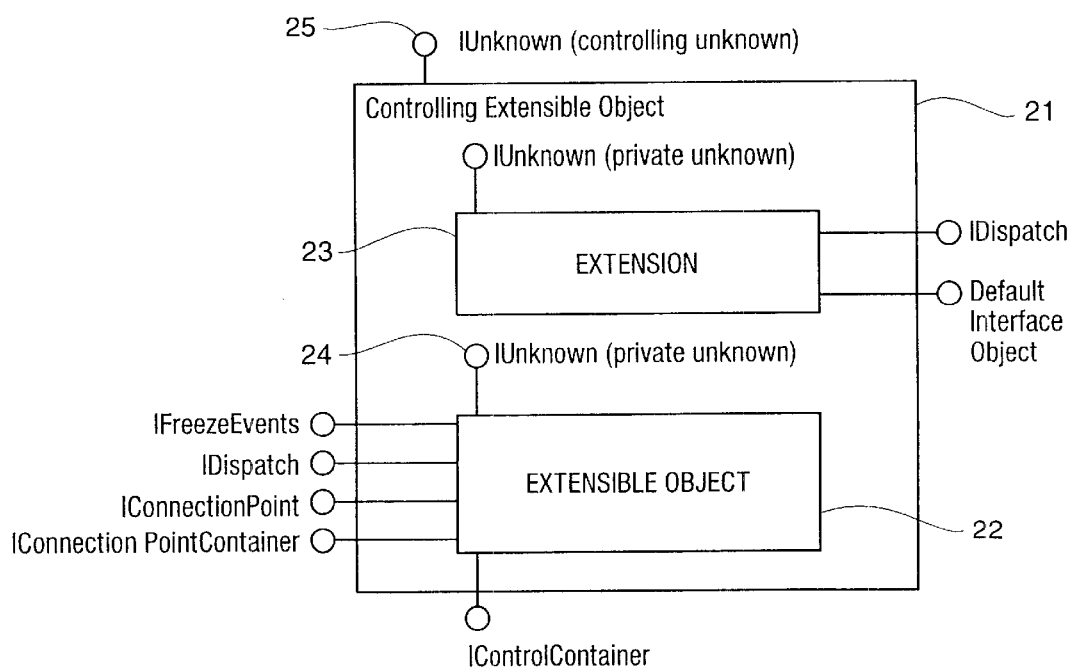
FIG. 3 illustrates the interrelation between the various elements contained within an extended object to expose the object's internal interface.

The operational rules for Extensible Object 22 are illustrated diagrammatically in FIG. 3. The Controlling Extensible Object 21 implements the controlling unknown for an aggregate of the Extensible Object 22 and the Extension 23 which comprise the Controlling Extensible Object 21. Each part of the aggregate has specific IUnknown::Queryinterface rules it must support beyond the usual Component Object Model (COM) rules for aggregators and aggregatees. These specific interfaces (rules) are illustrated in FIG. 3. The Controlling Extensible Object 21 implements the controlling unknown and is responsible for dynamically exposing the interfaces that are added to Extensible Object 22 by the Extension 23. The Controlling Extensible Object 21 must forward QueryInterface requests to the Extension 23 when an unrecognized interface is requested. The Extensible Object 22 indicates what interfaces it exposes by its support for IProvideClassInfo on the Extensible Object Design object. The Extensible Object 22 must implement at least a private unknown, which is used by the Extension 23 to query the interface for functionality supplied directly by the Extensible Object 22. The Extensible Object 22 exposes properties and methods by use of a dual interface, which is an interface whose methods can be accessed either directly through the interface's vtable or via IDispatch::Invoke, since all dual interfaces derive from IDispatch. The Extension interface that is tagged as the default in the provided type information defines the programmability interface. As with all aggregatees, the default interface must be accessible via the private unknown of the Extensible Object 22.

The DocumentSite object associated with the Extensible Object 22 provides IProvideClassInfo. An Extensible Object 22 that has events exposes them by supporting IConnectionPointContainer and one or more connection points. Because the Extension 23 owns the IConnectionPointContainer exposed by the Controlling Extensible Object 21, it can add a new interface to the combined object at any time by making them appear in the IConnectionPointContainer. Because the Controlling Extensible Object 21 forwards QueryInterface to the Extension 23, the Extension 23 can add a new interface to the combined object at any time. The new interface is marked as the default in the dynamic type information. Object extensions makes no attempt to define categories of events or standard event firing behavior in the context of multiple connected parties. When someone calls IConnectionPoint::Advise for an Extension-created connection point, the Extension actually connects the sink to both the new connection point and the original one. In this way, events that are fired by the Extensible Object 22 and new events that are introduced by the Extension 23 are all passed to the event sink which is handling events for the extended event interface. When a sink later disconnects by calling IConnectionPoint::Unadvise, the Extension disconnects the sink from the new connection point and from the old one.

All Extensible Objects 22 provide type information by supporting IProvideClassInfo. Type information is used by some Extensions 23 to generate event stubs and to sink the Extensible Objects events. The GetTypeInfo member returns a TKIND_COCLASS ITypeInfo which describes the set of interfaces that the object supports as given by the code:

```
interface IProvideClassInfo: IUnknown
{
    HRESULT GetTypeInfo_xe"GetTypeInfo"_(ITypeInfo
**pptinfo);
}
```

IProvideClassInfo::GetTypeInfo returns the static typeinfo for the object. This typeinfo specifies the set of interfaces that the object supports for its entire lifetime. In other words, it returns the same type description for an object, regardless of any instance modifications that might have been made to it.

Describing the Extensible Object and its Fixed Subobjects

The Extensible Object 22 is described with a COCLASS TypeInfo. This describes the static part of the Extensible Object 22: the part that never changes. The goal of the system for instance customization with application independent programming of controls is to describe the Extensible Object 22 and its fixed sub-parts in enough detail for the Extension 23 to expose all of the functionality, and enable users to extend the functionality, such as by writing event handlers or adding properties, methods and events. Since the static type information of the object is being described, it is possible to use, OLE Automation's MkTypLib.Exe tool to build a type library containing the required type info instances. As an example of this capability, the coclass description for a Word document with one property (Length), one method (InsertTable), one event (Repaginate), and one fixed sub-part (Header) is shown herein as an example:

```
// Definition of Header
//
    [dual, hidden]
    interface IHeader
    {
        [propget] HRESULT Text([retval] BSTR *Value);
        [propput] HRESULT Text(BSTR Value);
    }
    [oacompatible, hidden]
    interface EHeader
    {
        HRESULT Changed();
    }
    coclass Header
    {
        [default] IHeader;
        [default, source] EHeader;
    }
// Definition of Document
//
    [dual, hidden]
    interface IDocument
    {
        [propget, source] HRESULT Header([retval]Header **Value);
        [propget] HRESULT Length([retval] long *Value);
        HRESULT InsertTable(integer NumRows, integer NumColumns);
    }
    [oacompatible, hidden]
    interface EDocument
    {
        HRESULT Repaginate();
    }
    coclass Document
    {
        [default] IDocument;
        [default, source] EDocument;
    }
```

Note that the Header property in IDocument is tagged as a source property to indicate that it is an object-valued property that is a source of events.

Properties of Extension for Instance Customization

All Extensions 23 support aggregation, and implement a set of interfaces that describe the object as a whole, including IDispatch and ProvideClassInfo. Some Extensions 23 change the type of the object; others do not. An Extension 23 that only enables a developer to handle events does not change the type of the object. In general, the Extension 23 can change the type of the Controlling Extensible Object 21 by:

Adding properties, methods and events to the default programmability interfaces.

Removing properties, methods and events from the default programmability interfaces.

Adding and tombstoning interfaces.

Adding and tombstoning source interfaces.

Extension behaviors are listed in the table below:

| Behavior | Which Extensions | Related Interfaces |
|---|---|---|
| Support Aggregation | All | |
| Provide Type information | All | IProvideClassInfo |
| Implement IDispatch | All | IDispatch |
| Implement ICPContainer | Extensions that add events | ICPContainer |
| Implement the EO default interface | Extensions that support overriding properties and methods | |

Extensible Object and the Extension

An Extension 23 adds properties, methods and events to an Extensible Object 22. In order to make this possible, the Extension 23 implements IDispatch and IConnectionPointContainer so that the Extension 23 can later change the behavior of these interfaces. Extensions 23 that support overriding capability need to implement the Extensible Object's 22 default interface and delegate to the implementation of the interface on the Extensible Object 22. This is required so that if the user performs an override, existing pointers to the default interface continue to work. The Extension 23 may alter the type of the object it is extending. This section describes how the Extension 23 alters the type of the object. In order to extend the default programmability interface of the Extensible Object 22, the Extension 23 exposes a new interface. The new interface is marked as the default in type information if it is exposed by the Extension 23. In order to be the extension of the original interface, this new interface must support the members of the Extensible Object's default programmability interface by delegating to the Extensible Object 22. The new interface is returned when the Extension 23 receives a QueryInterface request for IDispatch or a QueryInterface for the default interface of the Extensible Object 22.

Code Behind Objects and Documents

The system for instance customization with application independent programming of controls supports the concept of code behind objects and documents. In this manifestation of the present system for instance customization with application independent programming of controls, the code is a module of Visual Basic and all modules are contained within a project. There is one project per storage and each object that has code behind it has its code contained within a separate module within the project. This is a mechanism to sink events for a particular object. There is a code module associated with a document project item or other project item. Only that code module sees the events for the document project item. Event handlers for the controls on the document project item can be written in the module associated with the project.

Creating and Setting the Extension

Figure 5:
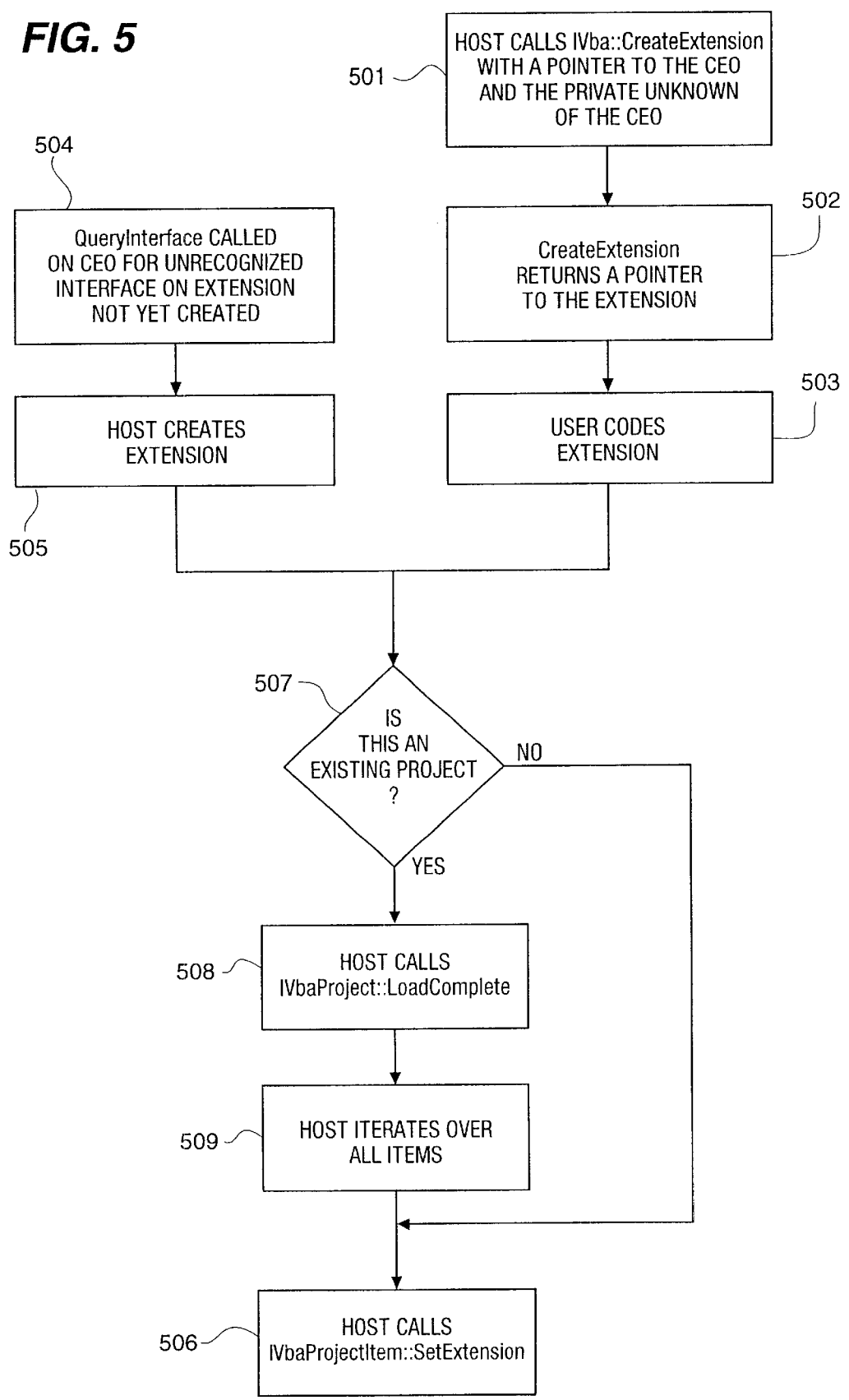
FIG. 5 illustrates in flow diagram form the steps taken by the present system for instance customization with application independent programming of controls to create and set an extension in a document.

Each Controlling Extensible Object 21, Extensible Object 22 and Extension 23 trio are associated with a particular document project item. Creating the Extension 23 and associating that extension with its document project item is accomplished in two steps: creating the extension and setting the extension of the document project item. The flow diagram of FIG. 5 illustrates the steps implemented by the system for instance customization with application independent programming of controls to perform these actions. To create the extension, the host calls IVba::CreateExtension at step 501 with a pointer to the Controlling Extensible Object 21 and a pointer to the private unknown of the Extensible Object 22. The Create Extension function returns a pointer to the Extension 23 at step 502 to identify the remaining element needed to implement the Controlling Extensible Object 21. At step 503, the user writes the code to implement the Extension 23. If, at step 504, QueryInterface is called on the Controlling Extensible Object 21 for an unrecognized interface that it would delegate to the Extension 23, and the Extension 23 associated with a Controlling Extensible Object 21 has not yet been created in step 503, the host must immediately create the Extension 23 at step 505 to be able to delegate the unrecognized interface. To set the Extension 23 of the document project item, the Extension 23 and the document project item must already have been created. The host then calls a method on VBA that is used to set the Extension 23 (IVbaProjectitem::SetExtension) at step 506 with a pointer to the Extension 23. In the case of loading an existing project as determined at step 507, the host should not call SetExtension until it has called IVbaProject::LoadComplete at step 508. Immediately after calling LoadComplete, the host should iterate at step 509 over all the document project items in the project and set the extensions for each. In the case of creating a new document project item, the host should call SetExtension at step 506 immediately after creating the new document project item.

Templates

A template is an instance of a Word document. When there is code in a document, the users can reuse the code in other instances of the document, which is accomplished in the template case by tying the code to the template to create a new template instance. Templates provide a limited form of inheritance. For example, a user can create a template document in Word then create a new document and set its template property to the template document. The new document inherits all the event handlers and methods (including event handlers of controls) of the template document. A user creates a template in a Word document that contains customization code and forms. A new document is created which uses this template. This new document inherits the behavior (event handlers and macros) of the template and further customization can be done to the document using instance customization.

Figure 4:
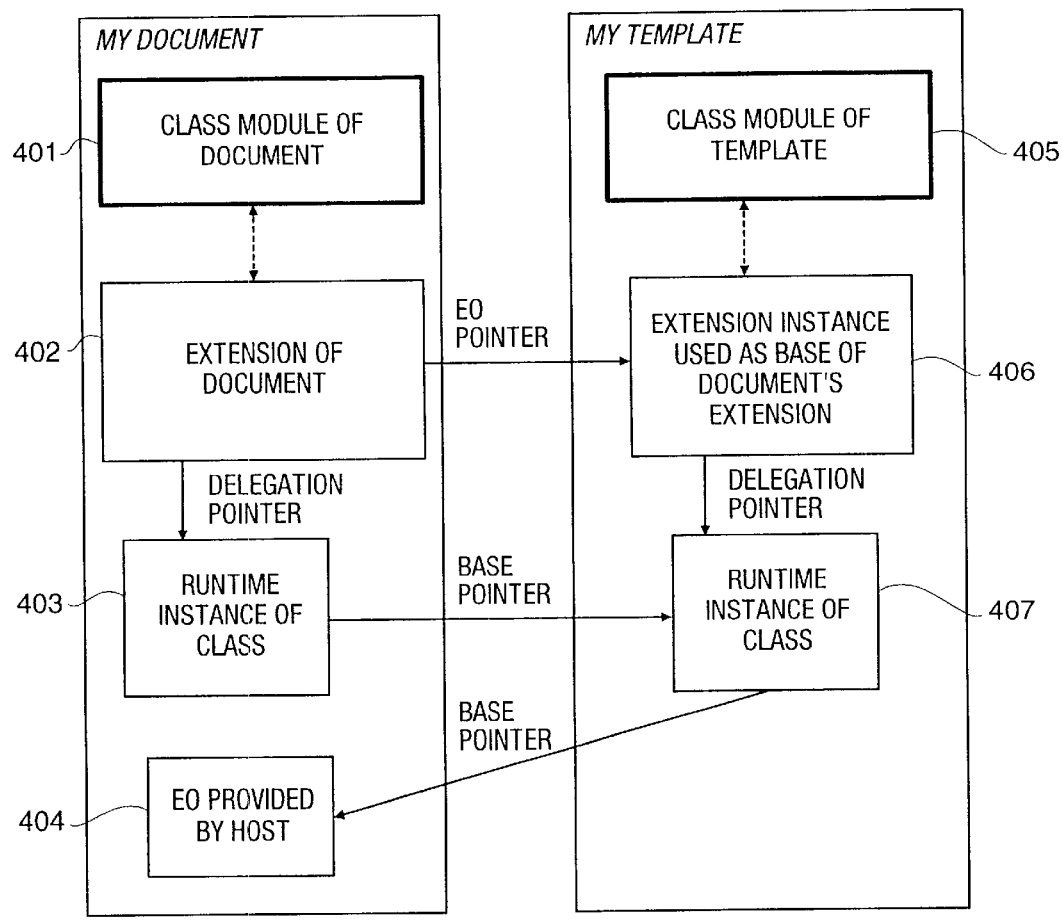
FIG. 4 illustrates the relationship between a document and a template during run-time in the present system for instance customization with application independent programming of controls.

FIG. 4 illustrates the relationship between a document (MyDocument) and a template (MyTemplate) at runtime. The extension instance 406 of the template is treated as if it is the Extensible Object pointer of MyDocument. The extension instance 406 in MyTemplate uses the Extensible Object pointer of MyDocument as its Extensible Object 22. In addition, the class module 401 of MyDocument is compiled to a runtime instance of class 403 and the class module 405 of MyTemplate is compiled to a runtime instance of class 406. In this way, the behavior of the resulting object combines the behavior added by the extension 402 of MyDocument with the behavior added by the extension of the template with the base behavior of the Extensible Object 404 of MyDocument. When a new instance of a document is created based upon a template, then a copy is made of all the contents of the document in the template and these copies are placed in the new document. This includes making a copy of each of the controls which were in the template document. The code that exists in the extension of the template is not copied, but rather is shared with the new document instance. The resulting contents and behavior of the new document are exactly the same as in the template document from which it was created. Events that are fired from the document and from the controls contained in the document are handled by the code in the template. It is possible for a user to delete a control on a document which originated in a template. Since there may be references in the code of the template to the deleted control, an error is generated if any of these references is executed.

Application Independent Programming of Controls

The present system for instance customization with application independent programming of controls also functions to provide a common programming model for controls that are used in a plurality of application programs included in an office suite and to enable a user to customize these controls for each application program. This is accomplished by producing an interface in the underlying Visual Basic layer of the office suite which enables a selected application program to augment the properties, methods and events provided by the underlying controls by adding "extender" properties, methods and in a consistent manner. The user can thus use a control in a variety of application programs, and have both a consistent experience as well as a customized experience—"consistent" in the sense that the functionality that is unique to the control is the same from application program to application program, and "customized" in the sense that behavior that is unique to the control container is different from application program to application program. All of this is accomplished without having to replicate the underlying control programmability function on which the customization is based.

The selected application program creates an extender file to add and/or modify the standard properties, methods and events of a control. The Visual Basic layer merges the user defined specific implementation of the control in a particular application program with these standard properties, methods and events of the underlying control to produce an extended control for use in the selected application program. The system for instance customization with application independent programming of controls therefore produces a customized control which merges the underlying control's properties, methods and events with the properties, methods and events provided by the application program. The resultant control is termed an extended control and comprises an object which is accessed programmatically.

Examples of the Problem

The basic problem outlined above can be appreciated by reviewing several instances where the problem appears in the application program environment. A first example is the case where the user embeds a customized object within a document and the container code accesses the embedding. Such an instance is where a user customizes a compound document: an Excel worksheet embedded in a Word document. The user writes code in the Word document that manipulates the Excel worksheet, such as code that accesses controls in the worksheet. An example of such code in the Word document is to insert a button that displays a text output when it is activated:

Sub Button 1_Click( )
Sheet1.Caption="Hello"
End Sub

The user clicks the "Run" button in Visual Basic to compile the newly written code. The user tests the code by clicking and then clicks the Button1 button on the document, and then moves on to do some other work. When the user later edits the worksheet by placing new controls in the worksheet, the user expects the code previously inserted in the document to continue working without a change or a reset. It is possible for the worksheet and the document to cooperate so that the worksheet can change its identity, but this requires changing the embedding protocol, which is unacceptable. Even if it were acceptable to change the embedding protocol, the coordination could not be fully enabled since the document would be required to do a "reset", thus causing loss of state. A reset is required because it is possible for the developer to have references to the "old" worksheet that existed prior to the insertion of the second set of code. If a reset occurs, then these references to the old worksheet are no longer valid, unless the user locates all references to the old sheet and updates these references.

A second example of the problem is where a user creates a Microsoft Office binder to combine a Word document and an Excel workbook. The user writes code in the binder that receives change notifications from the workbook and propagates changes as necessary to the Word document. Code exists in the Word document, in the workbook and in the binder. In this environment, there are many ways to obtain an object reference, and these cannot be efficiently managed. In particular, it cannot be assumed that all users in the application environment who hold object references support change notifications. Therefore, object references cannot be changed consistently and yet the functionality cannot be disabled because a down-level client holds an object reference.

Application Independent Programming of Controls Implementation

Figure 6:
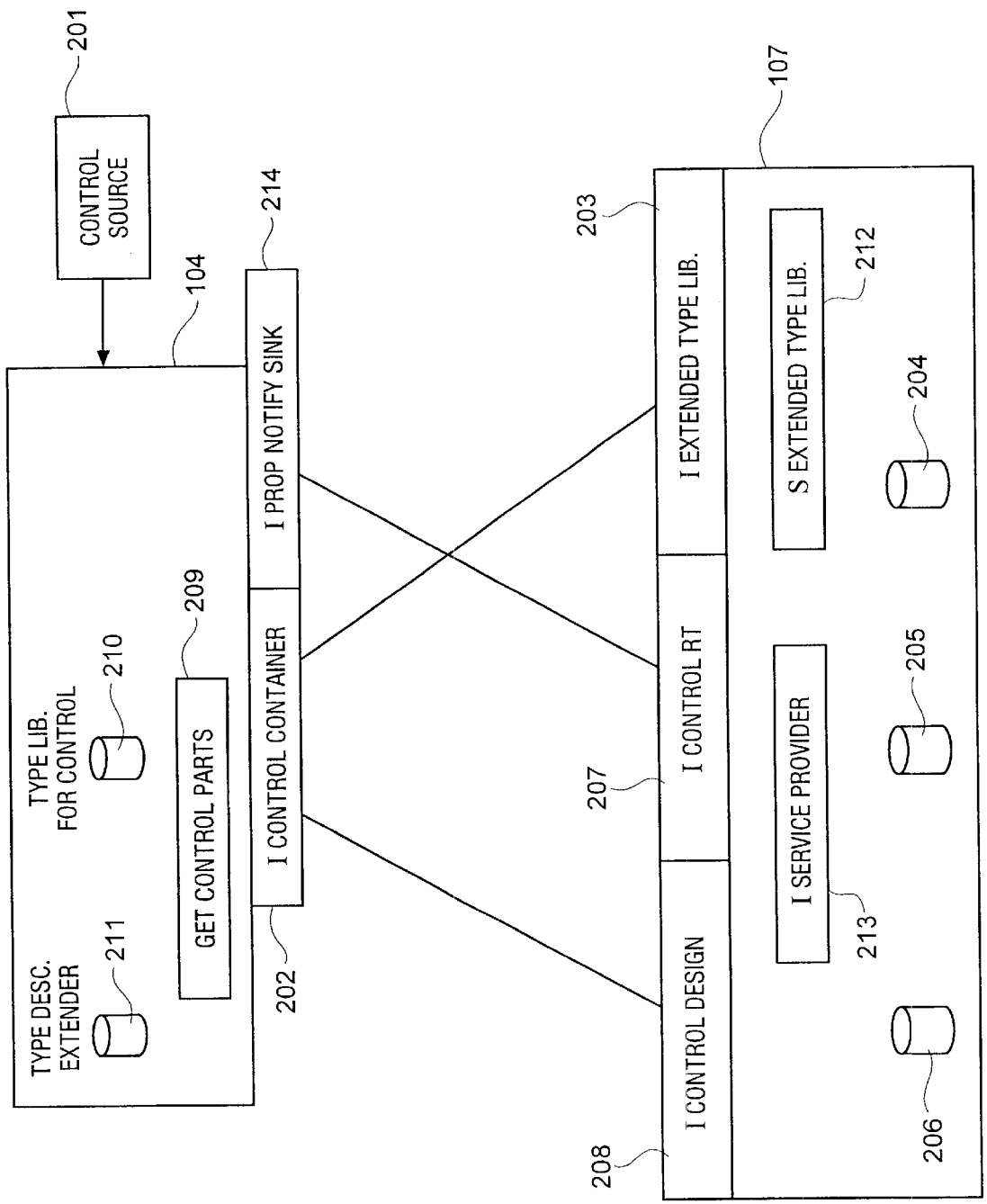
FIG. 6 illustrates the interrelation of various elements contained within the Visual Basic layer controls interface and the application programs that access this interface.
Figure 7A:
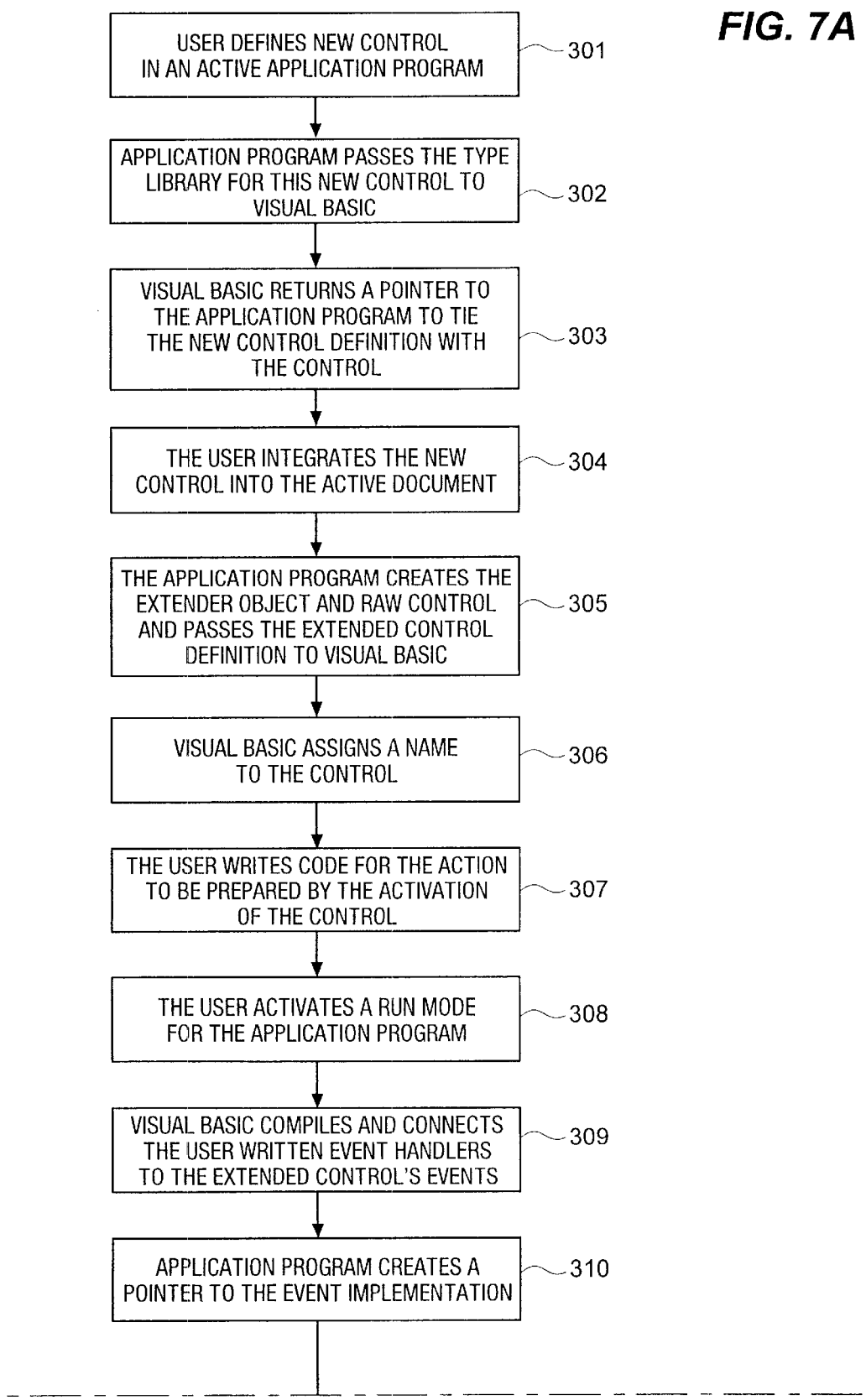
FIGS. 7A, 7B, and 7C illustrate in flow diagram form the operation of a typical application program which uses the system for instance customization with application independent programming of controls.
Figure 7B:
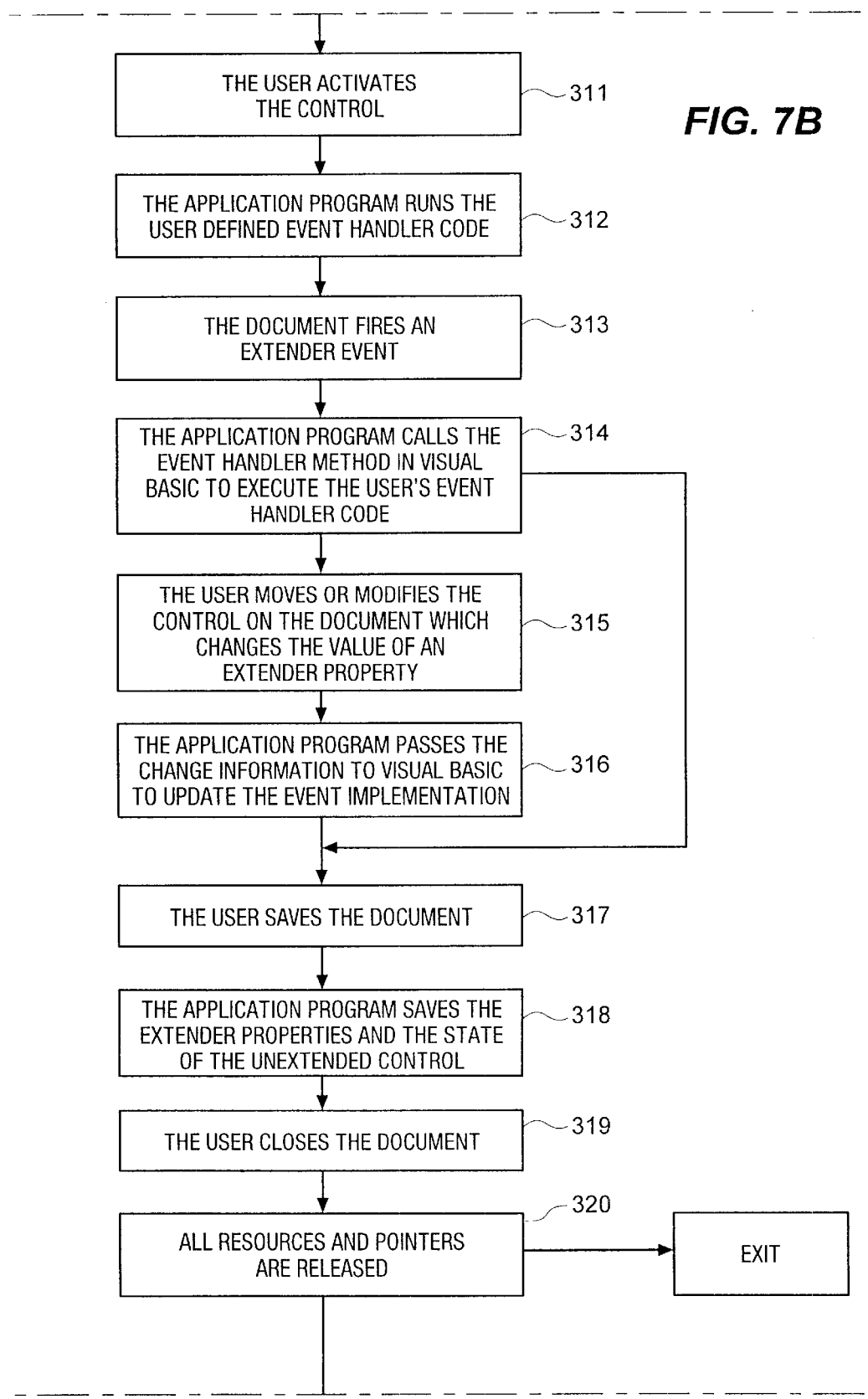
Figure 7C:
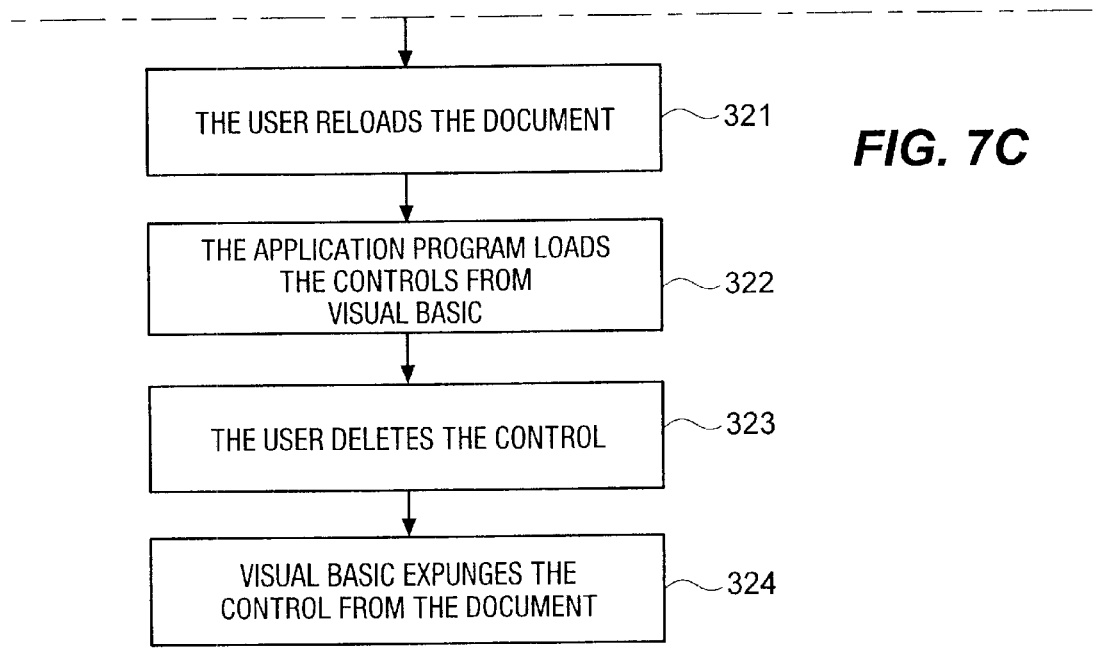

For the purpose of simplicity of description, the Word application program 104 is selected as the example and FIGS. 7A, 7B and 7C illustrate in flow diagram form the application independent programming of controls function in this application environment. In particular, the example comprises the method of implementing a control on a document created in application program 104 and writing event handlers for the events associated with the control. The specific example is the creation of a button on a Word document and the programming of the click event associated with the button, with FIG. 6 illustrating the underlying structures that support this function. To implement this function, each of the application program 104 and the system for instance customization with application independent programming of controls 107 implements a plurality of interfaces (202, 214) and (203, 207, 208), respectively, to exchange data that is used to create libraries (210, 211) and (204–206), respectively, that are used to link the user defined specific implementation of the control in the selected application program 104 with the standard properties, methods and events of the underlying control from the Visual Basic layer 103 to thereby produce an extended control for use in the selected application program 104.

The method is initiated at step 301, when the user, in a selected application program (Word) 104 defines a new control. The user can import a control from an external source 201 or create a control by using the capabilities of Visual Basic 103 and, in particular, the capabilities of the system for instance customization with application independent programming of controls 107. The user, in a well known fashion, selects the image associated with the control and various characteristics of this image, including for example: size, location on the document and thickness of the border, and the like. The user's definition of the control creates a type library entry 210 in the application program 104 which stores information relating to the selections that the user has elected to define this control. The application program 104, at step 302, then calls the interface 203 IExtendedTypeLib in the system for instance customization with application independent programming of controls 107 and passes ::AddRefExtendedTypeLib which contains the original type library 210 definition of the control that is referenced to this interface (203). This type library definition is used to produce an extended type library 204 in the system for instance customization with application independent programming of controls 107, which describes the properties, methods and events of the extended controls defined in the plurality of application programs 104–106. The extended type library 204 is therefore a container for type information which describes extended controls. It is necessary to come up with type information to describe the extended control for a variety of reasons, including compilation, browsing and "code behind objects."

In this regard, IExtendedTypeLib is an interface 203 which is provided by the SExtendedTypeLib service 212 of the system for instance customization with application independent programming of controls 107. The IExtendedTypeLib interface 203 is called by the application program 104 to create a type library entry which describes the instances of extended controls. The primary parameters passed to ::AddRefExtendeTypeLib are the filename of the original type library 210 produced by the OLE Control (OCX) vendor and the TypeInfo 211 describing the set of extender properties, methods and events to be added to each control. AddRefExtendedTypeLib also adds a reference from the application program 104 to the extended type library 204 if it does not already exist. The extender 211 is therefore an object which implements the extender properties and methods supplied by the container (application program 104) such as Top, Left, height and the like. At step 303, the pointer to the extender 211 is returned from the application program 104 as an output parameter of the interface 202 IControlContainer and contained in ::GetControlParts 209. The type definitions of extenders 211 are part of the application program's standard library.

An alternative to calling AddRefExtendedTypeLib, which requires that the application program 104 pass the filename of the original OCX library, is to call AddRefExtendedTypeLibOfClsid, which looks up the Class Identification (CLSID) of an OCX in the registry to determine the OCX library which contains its description. Instead of returning a TypeLib reference, AddRefExtendedTypeLibOfClsid returns a pointer to the extended TypeInfo of the control whose CLSID was passed in. This TypeInfo can then be passed by the application program 104 to the interface IControlDesign 208 using ::DefineControl. IControlDesign 208 is an interface implemented by the system for instance customization with application independent programming of controls 107 and is used by the application program 104 to add controls to the document and remove them from the document. The IControlDesign interface 208 is accessed by the application program 104 via the IServiceProvider interface 213 which is available on the system for instance customization with application independent programming of controls 107. The IServiceProvider interface 213 is passed the identification of the requester and returns IControlDesignPointer:: init(IControlContainer).

At step 304, the user places a button on the document. Before creating the control instance, the application program 104 notifies the system for instance customization with application independent programming of controls 107 that it wants to add the control by calling the IControlDesign interface 208 using ::DefineControl and passing it the TypeInfo from the type library 210 which describes the extended control. In response to the call using DefineControl, the IControlContainer::GetControlParts method in the application program 104 is called. At this point (step 305), the application program 104 must create the extender object 211 and raw control and return the pointers to these objects to the system for instance customization with application independent programming of controls 107 from GetControlParts 209. Creation of the raw control instance must wait until the function GetControlParts 209 is called, since the host processor needs to pass in the punkOuter for the extended control when creating the raw control. GetControlParts 209 must create the raw control and aggregate it into the extended control. GetControlParts 209 returns a pointer to the raw control and a pointer to the extender object 211 which implements the methods that the container wishes to extend the control with. In addition to the extender properties added by the document such as Visible, Top, Left, Color, etc., the controls programmability support adds in Name, Parent and Object properties. Even if the document were to add no extender properties, methods or events, these properties would still be added by Visual Basic 103.

The IControlContainer interface 202 is implemented by all application programs which support controls programmability. For document customization, the IControlContainer interface 202 has three essential methods: one for initialization which is called to specify an implementation of the IControlRT interface 207, one for getting the parts of an extended control, and one for setting the interface pointer which the container calls to fire extender events. IControlRT interface 207 is an interface implemented by the system for instance customization with application independent programming of controls 107 and it has one method which forces creation of a control instance which is used when reloading a document that contains customized controls. Before returning from GetControlParts 209, the host must addref the passed in punkOuter pointer and cache it. When the document is destroyed, this pointer is released. Finally, the system for instance customization with application independent programming of controls 107 at step 306 assigns a name to the control, such as button1, which name does not conflict with any other controls named in the document and is stored in name file 205.

At step 307, the user writes code for the defined button's click event and no action need be performed by the host. At step 308, the user clicks on the Run button for this application program 104 or performs an equivalent action which causes a transition of the document to the run mode. The system for instance customization with application independent programming of controls 107 at step 309 compiles and connects the user-written event handlers to the extended control's events. The extended control calls IControlContainer interface 202 with ::SetExtenderEventSink, which passes a pointer to the implementation of the event sink for the extender events at step 310 and an implementation of IPropNotifySink for the host to send the change notifications for extender properties. The application program 104 calls the method in the passed-in interface in order to fire the extender events. When a call is made to an extender property or method, the extended control forwards this call to the punkExtender interface returned from GetControlParts 209.

At step 311, the user switches back to the document and clicks the button, causing the event handling code to be run. The button raises its click event which causes the user's code to be run at step 312. At step 313, an action occurs in the document which causes an extender event to be fired. The application program 104 calls the event handler method in the interface in the system for instance customization with application independent programming of controls 107 that is set by the interface IControlContainer::SetExtenderEventSink. This causes the user's event handler code to be executed.

User Changes the Document

At step 315, the user moves a control on the document. This changes the value of an extender property of the control and the application program 104 must call the interface IPropNotifySink 214 with ::OnChanged which contains the DISPID of the property being passed at step 316 to the interface IControlContainer 202 via ::SetExtenderEventSink. At step 317, the user saves the document. When the application program 104 at step 318 saves the project associated with the document, the state of the properties which are added by the system for instance customization with application independent programming of controls 107 are saved by application program 104 as part of the project state. The document is responsible for saving the extender properties in file 211 that it provides as well as saving the state of the unextended control. At step 319, the user closes the document. As part of releasing the resources of the document, the document releases its pointer to the outer unknown of the control at step 320.

User Reloads Document

At step 321 the user reloads the document. The application program 104 at step 322 creates the extension instance associated with this document then calls the interface IControIRT 207 with ::ForceControlCreation as it loads the controls. ForceControlCreation calls back to the application program 104 via the interface IControlContainer 202 to ::GetControlParts 209, which must create and deserialize the control. Ultimately, at step 323 the user deletes the control from the document and the container calls the interface IControlDesign 208 with ::UndefineControl and the system for instance customization with application independent programming of controls 107 expunges the control from the document at step 324.

Summary

The system for instance customization with application independent programming of controls therefore functions to provide the capability for a user to change an object's behavior within a customized instance of a document in an application program without changing the object's identity and without impacting other users who have their own instances of the object, while also providing both a consistent programming model and functionality for these objects.

We claim:

1. In a computer system, which comprises a host processor having an operating system that presents an interface to a plurality of application programs, wherein an application program is capable of manipulating and modifying a document, the document being an object embedded in the application program, the plurality of application programs being installed on the host processor, a method for providing application instance customization capability to users of a selected application program by using object programming for creating an instance of the application program which contains user customized controls therein, comprising the steps of:

storing data, external to the plurality of application programs, that defines a plurality of extensible control objects, which provide properties for the embedded object;

selecting a first extensible control object from the plurality of extensible control objects;

providing a programming layer, for the plurality of application programs, that enables users to create a customized control;

inputting into the programming layer object customization data, comprising object extender data for the first extensible control object;

generating application program instance data for the application program;

creating a controlling extensible object as a controlling unknown for the first extensible control object;

aggregating the object extender data with the first extensible control object into the controlling extensible object;

holding a private IUnknown pointer to the first extensible control object; and merging the object customization data and the application program instance data to create a customized instance of the application program which contains the customized controls therein.

2. The method of claim 1 wherein the step of providing a programming layer comprises:

defining a set of properties, methods and events for the selected extensible object.

3. The method of claim 1 wherein the step of providing a programming layer comprises:

adding behavior to the first extensible control object by performing at least one of: handling its events, adding new interfaces, adding new members and adding new events.

4. The method of claim 1 wherein the step of merging further comprises:

implementing an interface IUnknown on the controlling extensible object as an external interface.

5. The method of claim 1 wherein the step of merging comprises:

dynamically exposing interfaces, contained in the controlling extensible object, that are added to the first extensible control object by the object extender data.

6. In a computer system, which comprises a host processor having an operating system that presents an interface to a plurality of application programs, wherein an application program is capable of manipulating and modifying a document, the document being an object embedded in the application program, the plurality of application programs being installed on the host processor, a method for providing application instance customization capability to users of a selected application program by using object programming for creating an instance of the application program which contains user customized controls therein, comprising the steps of:

storing data, external to the plurality of application programs, that defines a plurality of extensible control objects, which provide properties for the embedded object;

selecting a first extensible control object from the plurality of extensible control objects;

providing a programming layer, for the plurality of application programs, that enables users to create a customized control;

inputting into the programming layer object customization data, comprising object extender data for the first extensible control object;

generating application program instance data for the application program;

creating a controlling extensible object as a controlling unknown for the first extensible control object;

aggregating the object extender data with the first extensible control object into the controlling extensible object;

forwarding a query interface to the object extender data when an unrecognized interface is requested of the controlling extensible object; and merging the object customization data and the application program instance data to create a customized instance of the application program which contains the customized controls therein.

7. The method of claim 6 further comprising:
delegating query interface requests for interfaces including: IDispatch, IConnectionPointContainer, and a default interface for the first extensible control object.

8. The method of claim 1 wherein the step of merging comprises:
compiling at run time the object customization data with the first extensible control object to create an application program specific customized control object.

9. The method of claim 8 wherein the step of providing comprises:
storing control customization data comprising a definition of an appearance and location of the application program specific customized control object in the selected application program; and
storing control customization data comprising programmatic event data comprising at least one of: executable code, an executable command, identification of some activatable element associated with the computer system.

10. The method of claim 9 further comprising:
displaying the appearance of the application program specific customized control object at the location in the selected application program; and
executing a programmatic event defined by the stored programmatic event data in response to a user activating the application program specific customized control object.

11. The method of claim 1 wherein the object comprises a control, the method further comprising the steps of:
creating a control container in the selected application program; and
creating at least one container in the programming layer which interconnects with the control container in the selected application program for exchanging data therebetween.

12. In a computer system, which comprises a host processor having an operating system that presents an interface to a plurality of application programs, wherein an application program is capable of manipulating and modifying a document, the document being an object embedded in the application program, the plurality of application programs being installed on the host processor, a method for providing application instance customization capability to users of a selected application program by using object programming for creating an instance of the application program which contains user customized controls therein, comprising the steps of:
storing data, external to the plurality of application programs, that defines a plurality of extensible control objects, which provide properties for the embedded object;
selecting a first extensible control object from the plurality of extensible control objects;
providing a programming layer, for the plurality of application programs, that enables users to create a customized control;
defining a set of extender properties and methods for an application program specific customized control object in the selected application program;
transmitting a pointer from a control container in the selected application program to a container in the programming layer, the pointer identifying an extender type library entry in the selected application program that contains the set of extender properties and methods;
inputting into the programming layer object customization data, comprising object extender data for the first extensible control object;
generating application program instance data for the selected application program;
merging the object customization data and the application program instance data to create a customized instance of the selected application program which contains the customized controls therein;
creating a control container in the selected application program; and
creating at least one container in the programming layer which interconnects with the control container in the selected application program for exchanging data therebetween.

13. The method of claim 12 wherein the step of providing further comprises:
linking the pointer to the selected one of the plurality of extensible control objects.

14. The method of claim 13 wherein the step of providing further comprises:
storing in the selected application program in the selected one of the plurality of application programs a set of event handlers comprising code executable in response to activation of the customized control by a user.

15. The method of claim 14 wherein the step of providing further comprises:
transmitting a pointer from the control container in the selected one of the plurality of application programs to a container in the programming layer, the pointer identifying the set of event handlers.

16. In a computer system, which comprises a host processor having an operating system that presents an interface to a plurality of application programs installed on the host processor, a method for providing application instance customization capability to users of the plurality of application programs by using object programming for creating an instance of an application program which contains user customized controls therein, comprising the steps of:
storing data, external to the plurality of application programs, that defines a plurality of extensible control objects, which provide properties for the document object;
selecting a first extensible control object from the plurality of extensible control objects;
providing a programming layer, for the plurality of application programs, that enables users to create a customized control, and wherein, furthermore, defining a set of extender properties and methods for the application program specific customized control object in the selected application program in the selected one of the plurality of application programs and transmitting a pointer from the control container in the selected one of the plurality of application programs to a container in the programming layer, the pointer identifying an extender type library entry in the selected on of the plurality of application programs that contains the set of extender properties and methods, linking the pointer to the selected one of the plurality of extensible control objects, storing in the selected application program in the selected one of the plurality of application programs a set of event handlers comprising code executable in response to activation of the customized control by a user, transmitting a pointer from the control container in the selected one of the plurality of application programs to a container in the programming layer, the pointer identifying the set of event handlers;

inputting into the programming layer object customization data including object extender data for the first extensible control object;

generating application program instance data for the application program;

merging the user input object customization data and the application program instance data to create a customized instance of the application program which contains the customized controls therein, accessing, in the programming layer, the set of extender properties and methods via the extender type library entry in the selected one of the plurality of application programs that contains the set of extender properties and methods, accessing, in the programming layer, the set of event handlers stored in the application program in the selected one of the plurality of application programs, compiling the set of event handlers, the set of extender properties and methods, the selected one of the plurality of controls to create the application program specific customized control for the selected one of the plurality of application programs;

creating a control container in the selected one of the plurality of application programs; and creating at least one container in the programming layer which interconnects with the control container in the selected one of the plurality of application programs for exchanging data there between.

17. A method for providing application instance customization capability to users of a plurality of application programs, wherein an application program is capable of manipulating and modifying a first document, the first document being an object embedded in the application program, the plurality of application programs being in a computing environment having at least one common programming tool for creating a customized instance of the application program, the customized instance of the application program containing a user customized control therein, the method comprising the steps of:

providing, external to the plurality of application programs, a plurality of extensible control objects, which provide properties for the embedded object;

selecting, in the customized instance of the application program, a first extensible control object from the plurality of extensible control objects;

providing at least one interface in the common programming tool, the common programming tool interface enabling users to augment the first extensible control object with an extension to provide extender properties and methods supplied by the application program;

creating a controlling extensible object with a controlling unknown, where the controlling unknown is an external interface to the controlling extensible object;

holding, by the controlling extensible object, a private IUnknown pointer to the first extensible control object; and merging the extension and the first extensible control object to create the customized control in the customized instance of the application program.

18. The method of claim 17 wherein the step of providing the interface in the common programming tool comprises providing a first method in the common programming tool interface that can be accessed by the application for deleting the customized control responsively to user input.

19. The method of claim 17 wherein the step of merging further comprises:

dynamically exposing interfaces by the controlling extensible object to allow access to the extender properties and methods supplied by the application program for augmenting the first extensible control object.

20. A method for providing application instance customization capability to users of a plurality of application programs in a computing environment having at least one common programming tool for creating a customized instance of an application program, the customized instance of the application program containing a user customized control therein, the method comprising the steps of:

providing, external to the plurality of application programs, a plurality of extensible control objects, which provide properties for the document object;

selecting, in the customized instance of the application program, a first extensible control object from the plurality of extensible control objects;

providing at least one interface in the common programming tool, the common programming tool interface enabling users to augment the first extensible control object with an extension to provide extender properties and methods supplied by the application program; and merging the extension and the first extensible control object to create the customized control in the customized instance of the application program by creating a controlling extensible object with a controlling unknown, where the controlling unknown is an external interface to the controlling extensible object, the controlling extensible object holding a private IUnknown pointer to the first extensible control object, the controlling extensible object dynamically exposing interfaces to allow access to the extender properties and methods supplied by the application program for augmenting the first extensible control object, and the controlling extensible object forwarding a query interface request to an interface to the extension when an unrecognized interface is requested of the controlling extensible object in the query interface request.

21. The method of claim 17 wherein the method further comprises:

creating at least one container in the common programming tool, the common programming tool container providing an interface for interconnecting with a controlling extensible object.

22. The method of claim 17 wherein the method further comprises:

selecting a second extensible control object, the second extensible object not being one of the plurality of extensible control objects.

23. The method of claim 17 wherein the method further comprises:

managing at least one instance of the application program in a project.

24. The method of claim 17 wherein the method further comprises:

using the instance of the application program having customized controls to create a template, the template being used to create additional instances of the application program having customized controls by inheritance from the template.

25. A system for providing application independent programming of customized controls in a plurality of application programs wherein the customized controls have a functionality that is constant across the plurality of application programs while being customizable by at least one of the plurality of the application programs and/or user provided code, the system comprising:

- a common programming tool for providing a constant functionality across the plurality of applications;
- at least one common programming tool interface accessible to at least one of the plurality of application programs for requesting creation of a first customized control;
- a library of extensible controls available through the common programming tool, each of the extensible controls having an interface to interoperate with an extension;
- a library of extensions corresponding to at least one application, the library providing application specific methods, properties, and events to at least one extensible control from the plurality of extensible controls;
- at least one common programming tool interface accessible to at least one of the plurality of application programs for requesting deletion of a second customized control; and
- at least one application program having access to the common programming tool for creating a customized control by selecting an extensible control, an extension augmenting the extensible control, and providing a controlling extensible object with an external interface having a controlling unknown.

26. The system of claim 25 further having at least one application program having access to the common programming tool for modifying the customized control by adding another extension for augmenting the extensible control.

27. The system of claim 25 further having at least one project containing at least a first application program and a first customized instance of the first application program wherein furthermore a first extension augmenting a first extensible control is associated with the first instance of the application program.

28. The system of claim 25 further having at least a first customized instance of a first application program having a first extension augmenting a first extensible control forming a template wherein furthermore a second instance of the first application program inherits the first extension augmenting the first extensible control from the template.

29. A method of providing an extended control in an instance of one of a plurality of application programs having access to an common programming tool via a controls programming interface, the method comprising:

- using a plurality of interfaces, each interface in the plurality of interfaces comprising a pointer to a table of pointers, each pointer in the table of pointers pointing to a location of an object and wherein furthermore at least one pointer in the table of pointers accesses a function object for discovering interfaces;
- providing, for the instance of the application, at least one of the plurality of interfaces;
- providing a plurality of controls in association with the common programming tool, wherein furthermore each of the controls corresponds to at least one of the plurality of interfaces;
- providing a plurality of extender objects in association with the application program wherein furthermore each of the extender object corresponds to at least one of the plurality of interfaces and wherein furthermore at least one of the plurality of extender objects adds properties, methods, or events to a chosen control through corresponding interfaces; and
- using a container corresponding to the instance of the application to merge a first extender object associated with the application program with a first control from the plurality of controls using the interfaces from the plurality of interfaces associated with the first control and the first extender object to form a first extended control in the instance of the application.

30. The method of claim 29 wherein the common programming tool includes visual basic.

* * * * *

UNITED STATES PATENT AND TRADEMARK OFFICE
CERTIFICATE OF CORRECTION

PATENT NO. : 6,449,659 B1
DATED : September 10, 2002
INVENTOR(S) : Caron et al.

It is certified that error appears in the above-identified patent and that said Letters Patent is hereby corrected as shown below:

Column 1,
Lines 6 and 8, "patent" should read -- Patent --.
Line 8, "08/890,684" should read -- 08/890,634 --.

Column 2,
Line 3, "that that are" should read -- that are --.

Column 7,
Line 19, "Queryinterface" should read -- QueryInterface --.

Column 8,
Line 57, "Queryinterface" should read -- QueryInterface --.

Column 12,
Line 14, "...Projectitem..." should read -- ...ProjectItem... --.

Column 14,
Line 51, "system" should read -- System --.

Signed and Sealed this

Fourth Day of May, 2004

JON W. DUDAS
*Acting Director of the United States Patent and Trademark Office*